INVENTORS
EVERETT C. LEWIS
ROBERT G. TALLENT
ARTHUR L. PLUMLEY
BY Richard H. Berneike
ATTORNEY INVENTORS
EVERETT C. LEWIS
ROBERT G. TALLENT
ARTHUR L. PLUMLEY
BY Richard H. Berneike
ATTORNEY Oct. 8, 1968  E. C. LEWIS ET AL  3,404,663
PREVENTION OF FURNACE CORROSION
Filed Dec. 29, 1965  3 Sheets-Sheet 3

INVENTORS
EVERETT C. LEWIS
ROBERT G. TALLENT
ARTHUR L. PLUMLEY
BY Richard H. Berneike
ATTORNEY 3,404,663
PREVENTION OF FURNACE CORROSION
Everett C. Lewis, Avon, Robert G. Tallent, East Granby, and Arthur L. Plumley, Wapping, Conn., assignors to Combustion Engineering, Inc., Windsor, Conn., a corporation of Delaware
Filed Dec. 29, 1965, Ser. No. 517,260
6 Claims. (Cl. 122—7)

ABSTRACT OF THE DISCLOSURE

A chemical recovery furnace for burning and smelting black liquor from a paper pulping process having the water wall tubes coated with a corrosion resistant metal in the areas of relatively light corrosion between the secondary air ports and a level just above the primary air ports and a refractory material in the areas of heavy corrosion below the metal coating down to the smelt bed.

---

This invention relates generally to steam generators and more particularly to chemical recovery furnaces and a scheme for preventing deterioration of the furnace components.

Chemical recovery furnaces are employed in the pulp and paper industry as a portion of a system for recovering the energy and chemicals from the black liquor produced in pulping operations such as the kraft process. The combustibles in the liquor are burned in the furnace and the heat produced is employed to generate steam for use in various processes and apparatus within the pulp and paper plant. The non-combustibles in the liquor are smelted in the furnace and drained therefrom after which the chemicals in the smelt are reused in the pulping operation.

There has been in recent years a trend in the design and use of chemical recovery units to increase the pressure of the units, i.e., the pressure of the steam produced by the unit. As a result of this increase in pressure, the metal temperature of the steam generating tubes that line the furnace of the chemical recovery unit has increased. It has been found that at steam pressures of approximately 900 p.s.i. and above, a serious problem develops with regard to metal wastage and deterioration or what will be referred to as corrosion of the steam generating tubes particularly in the lower region of the furnace. These pressures correspond generally to tube metal temperatures of about 580° F. Ordinarily such temperatures would not cause such severe corrosion of the tubes which are normally formed of low carbon steel such as Type SA 192. However, the unique conditions and materials existing in chemical recovery units present corrosion problems not encountered in other types of furnaces. These conditions tend to lower the metal temperature limit such that corrosion occurs at lower temperatures.

In the operation of these chemical recovery units the black liquor is sprayed into the furnace at a location spaced well above the bottom of the furnace. The substantial moisture content of the liquor is driven off upon introduction into the furnace due to the high temperatures and the hot gases passing up through and contacting the liquor spray. The solids from the liquor fall to the bottom or hearth of the furnace where they accumulate in a pile. Primary combustion air is admitted to the furnace through ports adjacent to the pile of solids thereby causing the combustibles to be burned. Combustion is completed by the introduction of secondary combustion air usually at a location above the level of black liquor introduction. The temperatures prevailing in the pile of solids on the hearth are sufficient to cause the non-combustible constituents to smelt. This smelt gradually drains from the furnace into a smelt dissolving tank for subsequent processing.

The exact mechanism which causes the corrosion in chemical recovery units is not precisely known and is not pertinent to the present invention except for the fact that the particular conditions and type of corrosion are unique to chemical recovery furnaces. Smelt and other deposits form on and adhere to the surfaces throughout the furnace. The composition of these deposits change with elevation above the furnace hearth. The significant corrosion of the furnace waterwall tube metal occurs primarily below the secondary air ports in the lower portion of the furnace. The deposits on the waterwalls in this region are relatively high in sulfide content as compared to the deposits higher up in the furnace and a high rate of heat absorption is encountered in this region which causes the high tube metal temperatures. The combination of the high metal temperatures, the chemicals present in the waterwall deposits and the flue gases present create the corrosion problem. Furthermore, there is in the lowermost part of the furnace below the primary air ports ar interface between the furnace walls and the burning material disposed on the furnace floor. This particular area undergoes unusually rapid corrosion.

The problem of waterwall tube corrosion is extremely serious for several reasons, one of which is that a tube rupture in a chemical recovery unit creates a very hazardous condition since the mixing of water with the molten smelt in the bottom of the unit can result in serious explosions which can cause extensive property damage as well as injury to operating personnel. Moreover, the replacement of the tubes in the lower region of the chemica recovery units is difficult since this region must be made liquid tight so as to contain the molten smelt. Therefore adjacent tubes must be attached to each other either by welding the tubes in an abutting relationship or by welding them together through the use of intermediate fins or a skin casing must be placed around the waterwall tubes.

In order to provide a satisfactory and economic solution to the problem of tube metal corrosion in chemica recovery furnaces, there are provided, in accordance with the present invention, coatings on the waterwall tubes o: materials suitable for preventing the types of corrosior occurring in the various areas. It has been found tha proper protection requires different types of coatings ir various sections of the furnace. The present invention therefore, proposes a corrosion resistant metal coating ir the uppermost portion of the affected area and a specia refractory coating in the lowermost area adjacent the smelt bed where the most severe corrosion problems exist Accordingly, it is an object of the present invention t( provide a technique for preventing the deterioration, wast age and corrosion of the waterwall tubes of chemical re covery units.

Another object of the present invention is to provide an improved chemical recovery unit wherein various pro tective coatings are applied to the waterwall tubes in the area generally between the secondary air ports and the smelt bed.

A further object of the invention is to provide a chem ical recovery unit wherein a portion of the waterwall i protected against corrosion by means of a metal coatin; and a different portion is protected by means of a refrac tory material.

Other objects and advantages will become apparen from the following description of the invention when rea in conjunction with the accompanying drawings wherein FIG. 1 is a sectional view of a chemical recovery fur nace to which the present invention may be applied;

Figure 1:
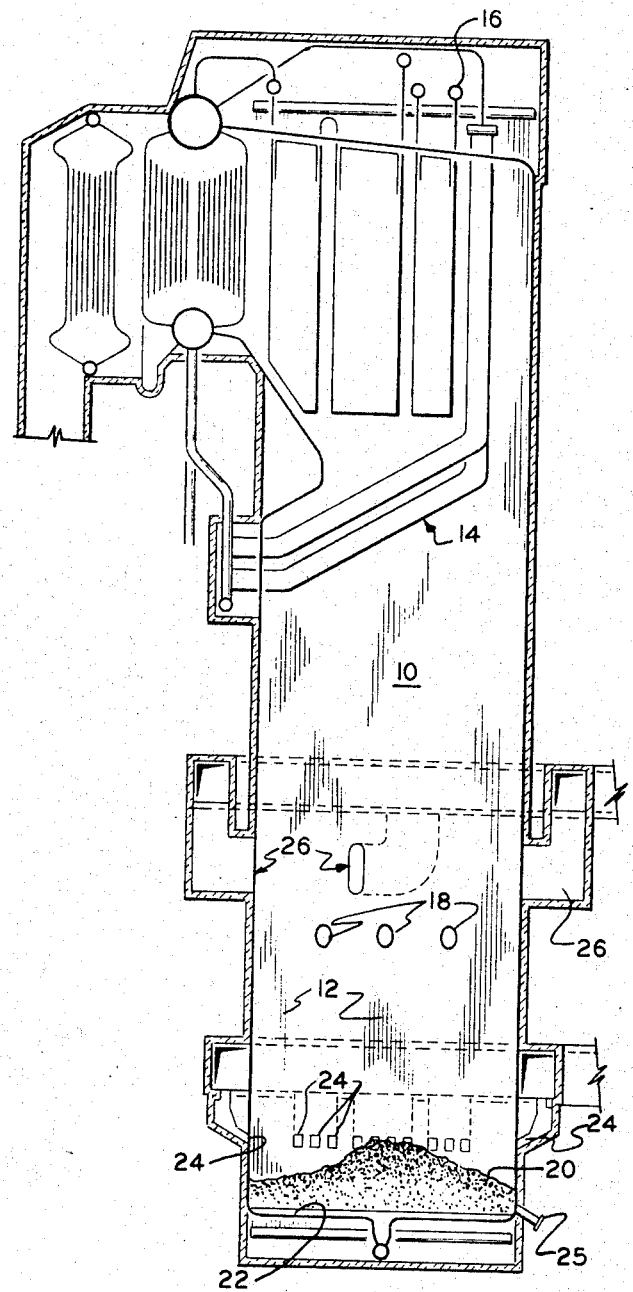

Referring now to the drawings wherein like reference characters are used throughout to designate like elements, the illustrative and preferred embodiment of the invention as depicted therein includes a chemical recovery unit as shown in FIG. 1 with a furnace section 10. The walls of this furnace are lined with steam generating tubes 12 that may be in tangent relation or may be in closely spaced relation with the space intermediate the tubes bridged by a fin. The tubes 12 that line the furnace 10 form part of the heat exchange surface of the chemical recovery unit with there being additional heat exchange surface identified generally as 14 at the upper region of the unit. The tubes 12 carry a mixture of steam and water at saturation temperature for the particular pressure at which the unit is operated with this mixture passing upwardly through these tubes. The illustrative steam generator is operative to produce steam at about 950 lb. per sq. inch pressure with this steam being conveyed from the header 16 to a desired point of use and with this steam being superheated to a desired value such as 900° F.

Black liquor obtained from the kraft pulping process is introduced into the furnace 10 through the nozzles 18. The liquor thus sprayed into the furnace descends downwardly toward the furnace bottom passing through rising combustion gases such that a majority of the moisture in the liquor is immediately evaporated. The solid particles fall downwardly through this rising combustion gas stream and form a pile 20 on the hearth or bottom 22. A portion of the burnables are consumed during this descent through the furnace with additional burnables being consumed on the pile 20. The non-burnable chemicals are melted and decanted through the discharge spout 25.

Combustion supporting air is introduced into the furnace at two locations. The primary air is introduced through nozzles or ports 24 spaced relatively close to the bottom as, for example, 3½ feet above the furnace bottom while the secondary air is introduced through the nozzles or ports 26 located above the liquor nozzles 18.

Figure 2:
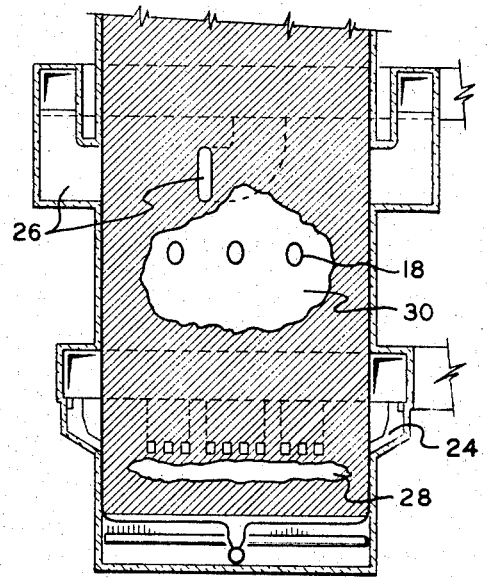
FIG. 2 is a view of the lower portion of the chemica recovery furnace illustrating the regions wherein corrosion of the waterwall tubes is most severe.
Figure 3:
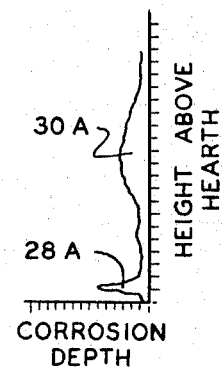
FIG. 3 is a graph illustrating the relative degrees of corrosion at various locations above the furnace hearth.

As previously discussed, chemical recovery units in which there are high metal temperatures due to the high operating pressures encounter serious corrosion in particular areas. These areas are identified in FIG. 2 as 28 and 30 and the relative depths of these corroded areas are illustrated respectively at 28A and 30A in the graph of FIG. 3. The area 28 is below the primary air ports adjacent the interface of the waterwalls and the smelt while area 30 occurs generally in the center portion of the waterwalls at the level of the black liquor nozzles 18. The deterioration or corrosion is usually concentrated in the central portions of the furnace walls probably due to a combination of the metal temperatures, the compositions of the deposits and the gas composition in these locations. The severity of these conditions is less in the corners of the furnace thus creating less of a corrosion problem. It can be readily seen from the FIG. 2 illustration that a majority of the corrosion occurs below the secondary air ports 26 while FIG. 3 illustrates that this corrosion is most severe between the molten smelt level and the primary air ports.

Figure 6:
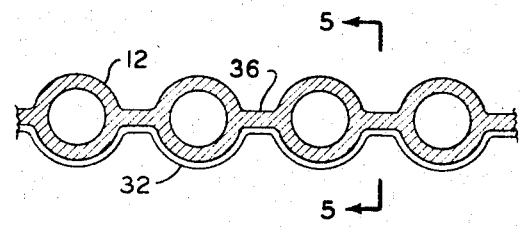
FIG. 6 is a plan view of a portion of a furnace waterwall taken along line 6—6 of FIG. 5.
Figure 5:
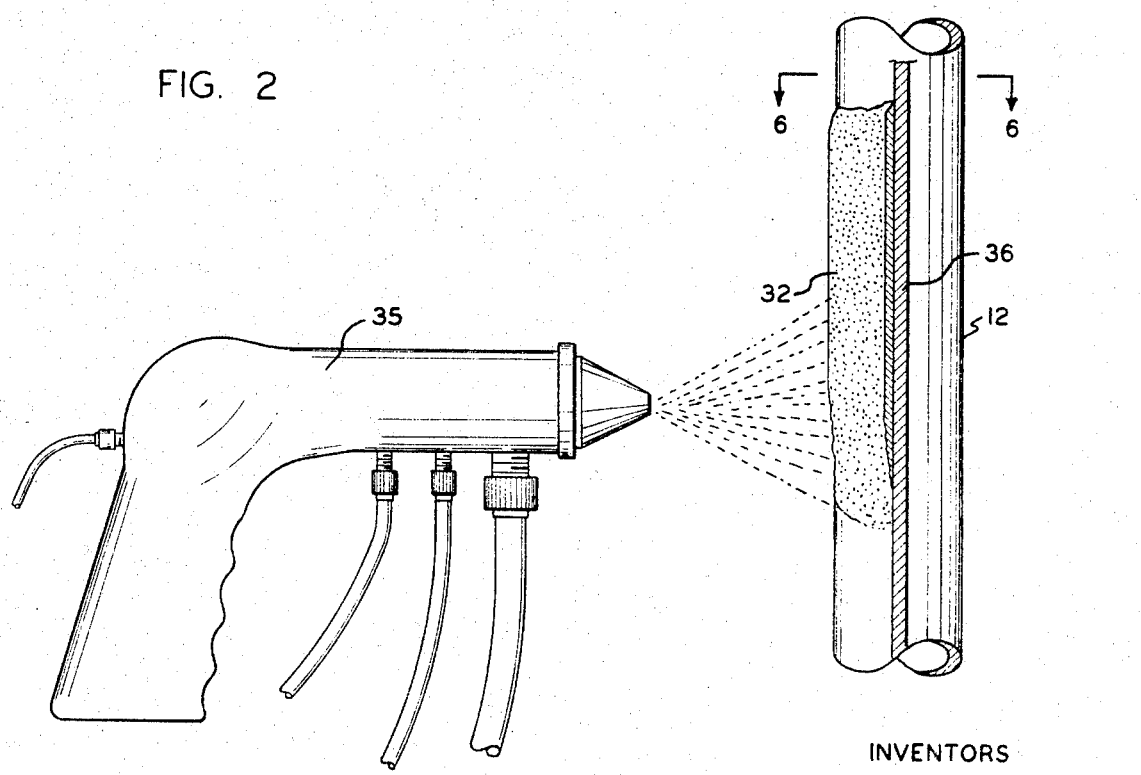
FIG. 5 is a side elevation view in cross section of a portion of a furnace waterwall in the area coated with metal.
Figure 8:
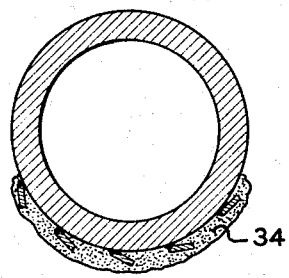
FIG. 8 is a plan view of a waterwall tube taken along line 8—8 of FIG. 7.
Figure 7:
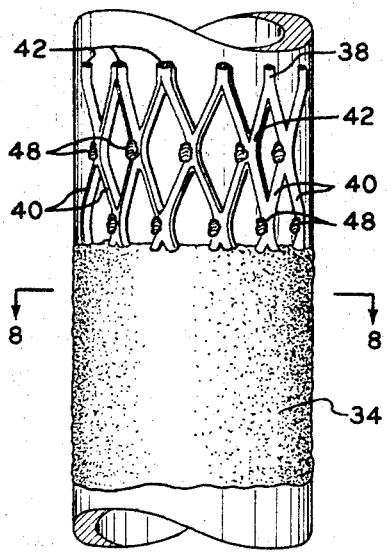
FIG. 7 is an elevation view of a waterwall tube having the refractory coating and retaining means for the coating attached thereto.
Figure 9:
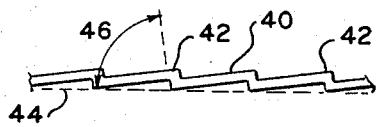
FIG. 9 is an end view of a sheet of standard expanded metal.
Figure 4:
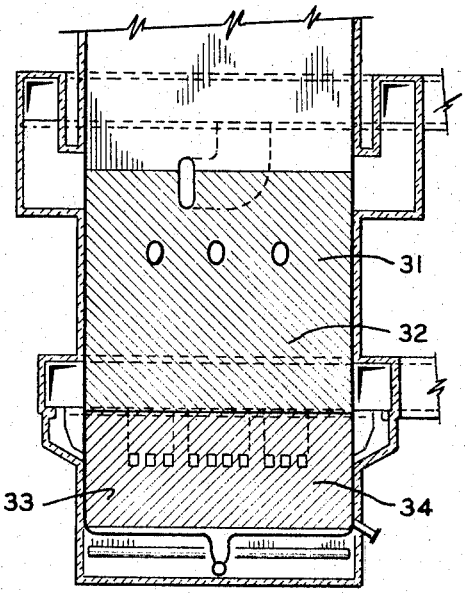
FIG. 4 is a detailed view of the lower portion of the chemical recovery furnace illustrating the areas in which the various coatings of the present invention are applied.

To overcome the problem of deterioration, wastage and corrosion on the furnace walls in the area 31 generally between the primary and secondary air ports, a layer of metal 32 is coated on the walls as shown in FIG. 4. It has been found, however, that these metal coatings may not be entirely satisfactory under certain severe conditions to reduce the type of corrosion experienced in the area 33 between the molten smelt level and the primary air ports. Therefore, a refractory coating 34 is applied in this general area as also shown in FIG. 4. The details of the metal coating 32 are shown in FIGS. 5 and 6 while the details of the refractory coating are illustrated in FIGS. 7, 8 and 9.

The metals which may be employed to coat the waterwall tubes comprise any of the metals which will resist the type of deterioration or corrosion occurring in the area 31. Aluminum coatings have been found satisfactory as well as stainless steel coatings such as Type 304 stainless steels. These coatings are applied to the waterwalls by the use of flame spraying, the techniques of which are well known and are fully discussed in "Flame Spray Handbook" by H. S. Ingham and A. P. Shepard, published by Metco Inc., 1964. This process basically involves the melting, atomizing and spraying of the desired metal onto the surface that is to be coated. FIG. 5 illustrates a flame spray gun 35 being employed to coat the tube 12. This FIG. 5 arrangement illustrates a steam generating tube 12 which has attached thereto a fin 36 which serves to connect adjacent tubes together. The top edge of the coating 32 will be located at an elevation generally corresponding to that of the secondary air ports while the lower edge of the coating would be in the general region of the primary air ports. FIG. 6 is a top view of the FIG. 5 arrangement illustrating the coating 32 on the tubes 12 and the fins 36.

Flame spraying tends to leave pores in the sprayed metal, particularly within thin layers such that it is often advantageous to apply a sealing material over the metal coating. Aluminum silicate is a satisfactory sealing material for the conditions existing within a chemical recovery unit. However, aluminum silicate will adhere more readily to aluminum than it will to stainless steels. Since the stainless steels may be more resistant to the type of corrosion encountered, it may be advantageous to first apply a stainless steel layer, then an aluminum layer which is subsequently coated with the aluminum silicate sealer.

The metal coating of the present invention may be applied to the waterwalls either before or after the furnace has been erected. Flame spraying is particularly advantageous in the present invention since it is an economical means of coating only the necessary surfaces. The invention can, therefore, be readily applied to existing chemical recovery units as well as to new units primarily due to the flame spraying technique. Flame spraying is also uniquely adaptable to repairing worn coatings as will be more fully pointed out hereinafter.

FIGS. 7, 8 and 9 illustrate the manner in which the refractory coating 34 is applied to the waterwall tubes. It is necessary in applying this refractory coating to provide means to retain the refractory in position as well as means to cool the refractory to prevent deterioration thereof. For this purpose there is provided a perforated metallic sheet 38 generally conforming to the tube surface and rigidly secured to the tubes. In the preferred embodiment this sheet is of standard expanded metal as is illustrated. This standard expanded metal is a commercially available product such as from the Penn Metal Company, Inc. It is formed from sheet metal which has been slit and expanded to form strands 40 united at bonds 42. It is formed such that the bonds 42 and the strands 40 are set at sharp angles to the plane of the sheet; for instance, in FIG. 9, the plane of the sheet may be identified as 44 while the angle of the bond may be identified as 46. By using this standard expanded metal, portions of the strands will be spaced from the tubes so that the refractory can flow under that portion of the strands. With such an arrangement the refractory will be securely held in place by means of the expanded metal embedded therein as illustrated in FIG. 8.

It is preferred that the expanded metal 38 which secures the refractory to the tubes be fabricated of stainless steel or other corrosion resistant metals for the reason that in operation the refractory layer will gradually wear down so that portions of the expanded metal will be exposed to the corrosive environment in the furnace. The expanded metal is welded to the surface of the tubes 12 by welds 48 at each of the bonds of the expanded metal. This has two effects, one of which is to securely fasten the expanded metal in place and the other of which is to provide good heat exchange between the expanded metal and the tubes. This latter heat exchange is necessary and desirable in order to keep the temperature of the expanded metal and the refractory layer as low as possible. Because of the configuration of the expanded metal and the frequent welds, cooling has been found to be very effective.

In covering the tubes on the furnace walls in the area below the primary air nozzles, the expanded metal is first welded into place after which the layer of refractory is applied over this expanded metal. The refractory is applied in a paste-like condition and allowed to harden. Satisfactory results have been obtained by utilizing a chrome base refractory bonding mortar which has the following analysis:

| | |
|---|---|
| $SiO_2$ | 28.7 |
| $Al_2O_3$ | 32.3 |
| CaO | 0.1 |
| MgO | 7.2 |
| $Na_2O$ | 0.2 |
| $Cr_2O_3$ | 15.9 |
| FeO | 8.6 |
| Ign. loss | 6.0 |

An example of such a material is the refractory bonding mortar of Refractory & Insulation Corporation marketed under the trademark "Super 3000." Of course, any suitable refractory may be employed.

It is obvious that with time any coating applied, whether it be metal or refractory, will wear down to some extent. Therefore, it will eventually be necessary to replace the coatings. This can readily be accomplished in the area 31 by cleaning the waterwall surface and flame spraying a new coating in the entire area or only in the most severely effected portions such as area 30. The flame spraying technique greatly facilitates this furance repair as far as both time and expense are concerned. The refractory coating, which may also wear away, may be replaced by applying new refractory material over the remaining refractory and expanded metal to which it will readily adhere.

Installation of the expanded metal and refractory coating is relatively more expensive and complicated than the application of the sprayed metal coatings. For this reason, the expanded metal and refractory coatings should only be applied to the height above the smelt which is necessary to prevent this most serious corrosion. This will usually be up to at least the primary air ports and perhaps six inches or so above the primary air ports. The sprayed metal coating should preferably then extend up to at least the liquor guns and perhaps up to the secondary air ports depending upon the severity of the corrosion taking place in the particular unit.

While we have illustrated and described particular embodiments of the present invention it is to be understood that these are merely illustrative and not restrictive and that variations and modifications may be made without departing from the spirit and scope of the invention.

We claim:

1. A chemical recovery unit for burning and smelting black liquor from a pulping process comprising a furnace having upright walls and a hearth upon which is formed a layer of black liquor smelt, steam generating tubes lining said furnace walls, said steam generating tubes being formed of a material which is relatively subject to corrosion, means for introducing said black liquor into said furnace at a location above said hearth and said layer of smelt, at least one primary air port between said hearth and said means for introducing black liquor at a location relatively close to but spaced above the level attained by said layer of smelt, at least one secondary air port at a location above said means for introducing black liquor, a coating of metal on said steam generating tubes between said secondary air port and a point immediately above said primary air port, said metal being relatively resistant to corrosion and a coating of refractory material on said steam generating tubes from said point immediately above said primary air port to a point generally corresponding to the level attained by said layer of smelt.

2. A chemical recovery unit as recited in claim 1 wherein said refractory is retained on said steam generating tubes by means of metallic means attached to and generally conforming to said tube surface, said metallic means having numerous relatively closely spaced openings dispersed throughout.

3. A chemical recovery unit as recited in claim 2 wherein said metallic means comprises standard expanded metal of a material relatively resistant to corrosion.

4. A chemical recovery unit as recited in claim 3 wherein said coating of metal and said standard expanded metal are selected from the group consisting of aluminum, stainless steel and combinations thereof.

5. A steam generator including a furnace wherein a fuel is burned, tubes in said steam generator forming heat transfer surfaces, said tubes being formed of a material which is relatively subject to corrosion, said steam generator having areas wherein said tubes are subject to relatively heavy corrosion and other areas wherein said tubes are subject to relatively light corrosion and other areas wherein said tubes are subject to substantially no corrosion, a coating of metal on said steam generating tubes in said areas subject to light corrosion, said coating of metal being relatively resistant to corrosion, and a coating of refractory material on said tubes in said areas subject to heavy corrosion.

6. A steam generator as recited in claim 5 wherein said steam generator is a chemical recovery unit and wherein said areas of heavy corrosion are in the lower portions of said furnace and the areas of light corrosion are in the upper portions of said furnace.

References Cited

UNITED STATES PATENTS

| 2,789,881 | 4/1957 | Hochmuth | 122—7 |
| 3,048,154 | 8/1962 | Braddy | 122—7 |
| 3,139,866 | 7/1964 | Lumm et al. | 122—6 |

CHARLES J. MYHRE, *Primary Examiner.*